US012795629B2

(12) United States Patent
Shvodian

(10) Patent No.: US 12,795,629 B2
(45) Date of Patent: Nov. 10, 2026

(54) VARIABLE CONFIGURATIONS FOR UTILIZING NON-CONTIGUOUS SPECTRUM

(71) Applicant: T-MOBILE INNOVATIONS LLC, Overland Park, KS (US)

(72) Inventor: William M. Shvodian, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 274 days.

(21) Appl. No.: 18/734,969

(22) Filed: Jun. 5, 2024

(65) Prior Publication Data

US 2025/0380247 A1 Dec. 11, 2025

(51) Int. Cl.

| | |
|---|---|
| ***H04W 72/0453*** | (2023.01) |
| ***H04L 41/5009*** | (2022.01) |
| ***H04W 72/51*** | (2023.01) |
| ***H04W 72/541*** | (2023.01) |

(52) U.S. Cl.

CPC ..... *H04W 72/0453* (2013.01); *H04L 41/5009* (2013.01); *H04W 72/51* (2023.01); *H04W 72/541* (2023.01)

(58) Field of Classification Search

CPC ............. H04W 72/0453; H04W 72/51; H04W 72/541; H04L 41/5009

See application file for complete search history.

(56) References Cited

U.S. PATENT DOCUMENTS

| | | | | |
|---|---|---|---|---|
| 6,975,837 | B1 | 12/2005 | Santoru | |
| 11,825,500 | B1 | 11/2023 | Shvodian | |
| 2006/0251041 | A1 | 11/2006 | Pajukoski et al. | |
| 2010/0097963 | A1 | 4/2010 | Astely et al. | |
| 2011/0051711 | A1 | 3/2011 | Kishiyama et al. | |
| 2011/0319088 | A1 | 12/2011 | Zhou et al. | |
| 2014/0148122 | A1 | 5/2014 | Meredith et al. | |
| 2015/0110004 | A1 | 4/2015 | Katz | |
| 2017/0303274 | A1 | 10/2017 | He et al. | |
| 2017/0303278 | A1* | 10/2017 | Calin | H04B 17/336 |
| 2018/0220474 | A1* | 8/2018 | Laselva | H04W 28/0865 |

(Continued)

OTHER PUBLICATIONS

Examiner Interview received for U.S. Appl. No. 17/316,086, mailed on Jan 13, 2023, 1 pages.

(Continued)

*Primary Examiner* — Hoang-Chuong Q Vu

(74) *Attorney, Agent, or Firm* — SHOOK, HARDY & BACON L.L.P.

(57) ABSTRACT

Embodiments of the present disclosure are directed to optimizing the use of non-contiguous spectrum by using variable radio configurations depending on the radio environment and UE capabilities. If the radio environment is favorable, such as when interference or near-far effect is low, then then a UE can utilize both blocks of non-contiguous spectrum with an intervening portion blanked. If the radio environment is unfavorable, such as when interference or near-far effect is negatively impacting a UE, and the UE is capable of intra-band carrier aggregation, then the UE can be separately allocated the non-contiguous blocks of spectrum for use with a carrier aggregation session; else, if the UE is not capable of intra-band carrier aggregation, then the UE will be allocated only one of the non-contiguous blocks of spectrum.

9 Claims, 5 Drawing Sheets

(56) References Cited

U.S. PATENT DOCUMENTS

| | | | | |
|---|---|---|---|---|
| 2019/0182677 | A1* | 6/2019 | Zhao | H04W 72/0453 |
| 2019/0207688 | A1* | 7/2019 | Sun | H04W 24/08 |
| 2019/0349815 | A1 | 11/2019 | Tiirola et al. | |
| 2021/0377804 | A1* | 12/2021 | Sivaraj | H04W 76/15 |
| 2021/0410107 | A1 | 12/2021 | Park et al. | |
| 2022/0116161 | A1* | 4/2022 | Jones | H04W 72/23 |
| 2022/0191894 | A1 | 6/2022 | Harada et al. | |
| 2022/0408300 | A1* | 12/2022 | Bellamkonda | H04W 24/02 |
| 2024/0147269 | A1* | 5/2024 | Youtz | H04W 48/12 |
| 2024/0152820 | A1* | 5/2024 | Singh | G06N 20/00 |

OTHER PUBLICATIONS

Examiner Interview received for U.S. Appl. No. 17/316,086, mailed on Mar 28, 2023, 2 pages.

Non-Final Office Action received for U.S. Appl. No. 17/316,086, mailed on Apr. 20, 2023, 11 pages.

Non-Final Office Action received for U.S. Appl. No. 17/316,086, mailed on Jan. 13, 2023, 10 pages.

Non-Final Office Action received for U.S. Appl. No. 17/316,086, mailed on Oct. 17, 2022, 8 pages.

Notice of Allowance received for U.S. Appl. No. 17/316,086, mailed on Jul. 11, 2023, 5 pages.

* cited by examiner

VARIABLE CONFIGURATIONS FOR UTILIZING NON-CONTIGUOUS SPECTRUM

SUMMARY

The present disclosure is directed to allocating non-contiguous channel resources to a user equipment (UE) in a wireless communication environment, substantially as shown and/or described in connection with at least one of the Figures, and as set forth more completely in the claims.

According to various aspects of the technology, non-contiguous channel resources are variably allocated to UEs based on the radio environment and UE capabilities. Non-contiguous spectrum in the same band is commonly treated as separate component carriers for a carrier aggregation session, when a UE is capable of intra-band carrier aggregation. When the radio environment is favorable, a UE can avoid the unnecessary use of a second receive chain if a base station treats the blocks of non-contiguous spectrum in the same band as a single component carrier with blanked physical resource blocks in the intervening frequency block that separates the two usable (but non-contiguous) frequency blocks. When the radio environment is unfavorable, UE capabilities can be used to determine whether a particular UE should be allocated multiple frequency blocks in an intra-band carrier aggregation session or if only one of the non-contiguous frequency blocks should be allocated. By dynamically and variably managing sessions between a base station using non-contiguous spectrum and a UE, overall spectral and processing efficiency increases for all UEs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
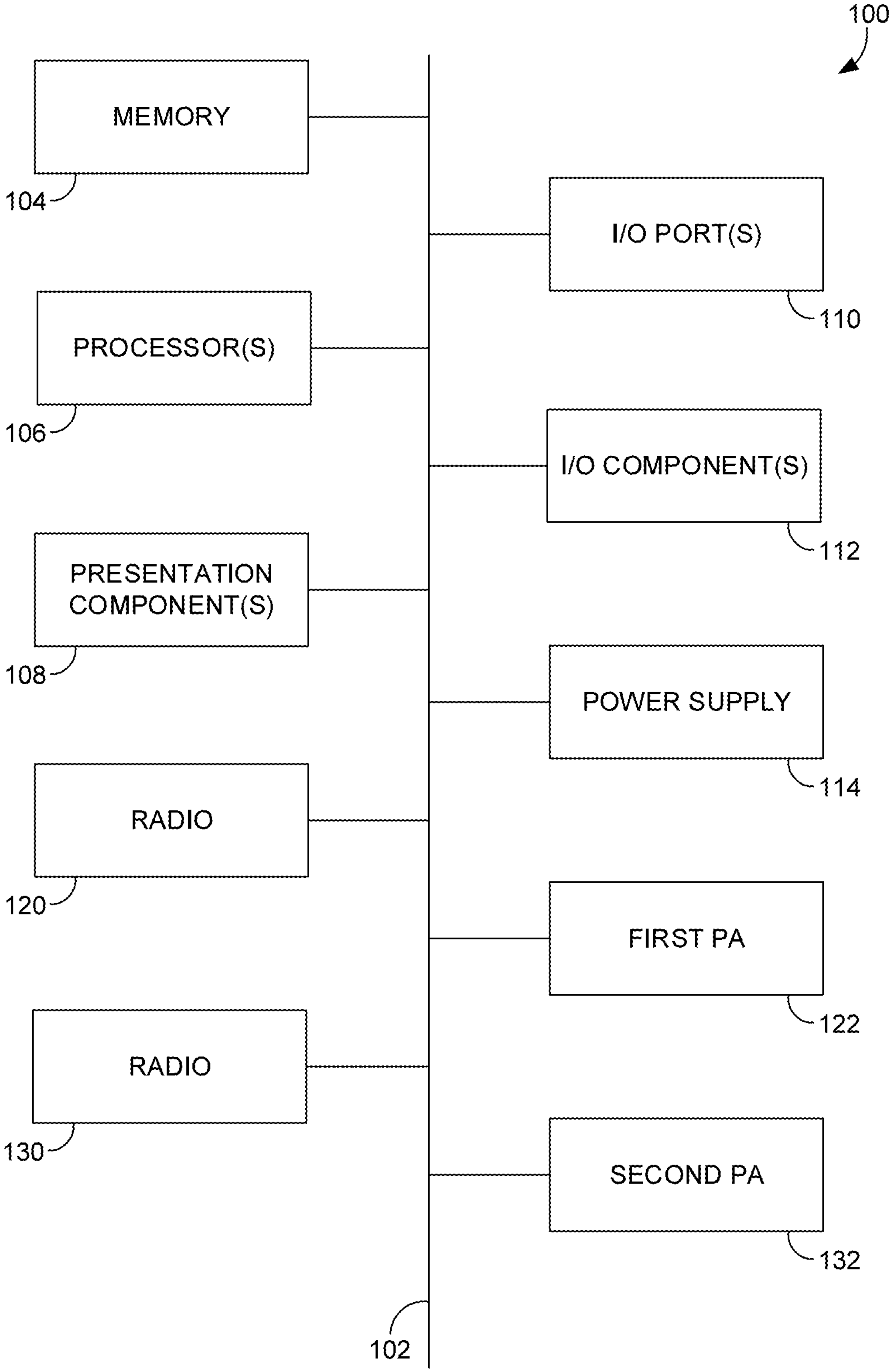
FIG. 1 illustrates a computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32*d* Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies suitable for use with the present disclosure include but are not limited to 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, modern wireless communication systems have a prescribed amount of channel bandwidth available for use with wireless client devices (aka UEs). Whether limited by a license or an unlicensed restriction, it is not uncommon for two portions of non-contiguous spectrum to be usable by an operator. An example of such a situation would be if an operator was permitted to use a first block of spectrum from 1900 MHz to 1905 MHz and a second block of spectrum from 1910 MHz to 1915 MHz, but the intervening block of spectrum from 1905 MHz to 1910 MHz was licensed to a different operator. In most jurisdictions, a licensee of radio frequency (RF) spectrum resources is strictly forbidden from operating beyond its frequencies, but because spectrum is a highly-coveted asset, operators are motivated to use every portion of their licensed spectrum as efficiently as possible.

Conventionally, non-contiguous spectrum has been utilized in two primary ways. Prior to carrier aggregation, each block of non-contiguous spectrum would be separately allocated to UEs; since carrier aggregation, the two blocks of non-contiguous spectrum can be treated as separate carrier components and allocated to a particular UE to create a larger effective bandwidth for the UE. Unfortunately, not all UEs are capable of performing intra-band carrier aggregation. or there may be limits on the maximum number of CCs supported by the UE, limiting the ability to use intra-band CA in some cases. As an alternative to using intra-band carrier aggregation, some have suggested that two blocks of non-contiguous spectrum and the intervening block of spectrum can be treated as a single larger band and the intervening portion of spectrum can be blanked. In particular, the use of blanking to utilize a non-contiguous amount of spectrum would be advantageous because it allows a UE to use a larger amount of channel bandwidth without requiring the use of a separate receive chain (which would be required if the UE used carrier aggregation); unfortunately, such a solution is vulnerable to near-far interference caused by proximate emitters on adjacent or neighboring spectrum-particularly when the proximate emitter utilizes the intervening portion of spectrum.

Unlike conventional solutions, the present disclosure is directed to optimizing the use of non-contiguous spectrum by using variable radio configurations depending on the radio environment and UE capabilities. If interference or near-far effect is low, then then a UE can utilize both blocks of non-contiguous spectrum with an intervening portion blanked. If interference or near-far effect is negatively impacting a UE and the UE is capable of intra-band carrier aggregation, then the UE can be separately allocated the non-contiguous blocks of spectrum for use with a carrier aggregation session; else, if the UE is not capable of intra-band carrier aggregation or has reached its maximum number of CCs for carrier aggregation, then the UE will be allocated only one of the non-contiguous blocks of spectrum.

Accordingly, a first aspect of the present disclosure is directed to a system for allocating non-contiguous frequency resources to a user equipment (UE) in a wireless communication system. The system comprises a first base station configured to wirelessly communicate with a first coverage area. The system further comprises a second base station configured to wirelessly communicate with a second coverage area. The system further comprises a third base station configured to wirelessly communicate with a third coverage area. The system further comprises one or more computer processing components configured to perform a series of operations. Said operations comprise allocating a bandwidth to a first session between the first base station and a first UE based on a determination that one or more key performance indicators (KPIs) are better than a threshold in an intervening portion of the bandwidth in the first coverage area, the bandwidth comprising a first portion, a second portion, and the intervening portion, wherein the intervening portion at least partially separates the first portion from the second portion. Said operations further comprise allocating the first portion without allocating the intervening portion and second portion to a second session between the second base station and a second UE based on a determination that the one or more KPIs are worse than the threshold in the intervening portion in the second coverage area and based on a determination that the second UE does not meet one or more aggregation requirements. Said operations further comprise allocating the first portion and the second portion without allocating the intervening portion to a third session between the third base station and a third UE based on the determination that the one or more KPIs are worse than the threshold in the intervening portion in the third coverage area and based on a determination that the third UE meets one or more aggregation requirements, wherein the first portion and the second portion are used in a carrier aggregation session between the third base station and the third UE.

A second aspect of the present disclosure is directed to a method for allocating non-contiguous frequency resources to a user equipment (UE) in a wireless communication system. The method comprises communicating, by a serving base station, a cell-specific channel bandwidth, the cell-specific channel bandwidth comprising a first frequency block, a second frequency block, and an intervening frequency block, wherein the intervening frequency block separates the first frequency block and the second frequency block. The method further comprises determining a neighboring base station is utilizing at least a portion of the intervening frequency block. The method further comprises receiving, by the serving base station, a capability message from a first UE indicating it does not support intra-band carrier aggregation. The method further comprises, based on the determination and the capability message, allocating the first frequency block to the first UE without allocating the intervening frequency block and without allocating the second frequency block.

Another aspect of the present disclosure is directed to a method for utilizing non-contiguous spectrum in a wireless communication environment. The method comprises communicating, by a serving base station, a cell-specific channel bandwidth, the cell-specific channel bandwidth comprising a first frequency block, a second frequency block, and an intervening frequency block, wherein the intervening frequency block separates the first frequency block and the second frequency block. The method further comprises determining a neighboring base station is utilizing at least a portion of the intervening frequency block. The method further comprises receiving, by the serving base station, a capability message from a UE indicating it supports intra-band carrier aggregation. The method further comprises based on the determination and the capability message, allocating the first frequency block and the second frequency block to the UE as separate component carriers in an intra-band carrier aggregation session.

Another aspect of the present disclosure is directed to a non-transitory computer readable media having instructions stored thereon that, when executed by one or more computer processing components, cause the one or more computer processing components to perform a method for allocating non-contiguous frequency resources to a user equipment (UE) in a wireless communication system. The method comprises communicating, by a serving base station, a cell-specific channel bandwidth, the cell-specific channel bandwidth comprising a first frequency block, a second frequency block, and an intervening frequency block, wherein the intervening frequency block separates the first frequency block and the second frequency block. The method further comprises determining a neighboring base station is utilizing at least a portion of the intervening frequency block. The method further comprises receiving, by the serving base station, a capability message from a first UE indicating it does not support intra-band carrier aggregation. The method further comprises, based on the determination and the capability message, allocating the first frequency block to the first UE without allocating the intervening frequency block and without allocating the second frequency block.

Another aspect of the present disclosure is directed to a non-transitory computer readable media having instructions stored thereon that, when executed by one or more computer processing components, cause the one or more computer processing components to perform a method for allocating non-contiguous frequency resources to a user equipment (UE) in a wireless communication system. The method comprises communicating, by a serving base station, a cell-specific channel bandwidth, the cell-specific channel bandwidth comprising a first frequency block, a second frequency block, and an intervening frequency block, wherein the intervening frequency block separates the first frequency block and the second frequency block. The method further comprises determining a neighboring base station is utilizing at least a portion of the intervening frequency block. The method further comprises receiving, by the serving base station, a capability message from a UE indicating it supports intra-band carrier aggregation. The method further comprises based on the determination and the capability message, allocating the first frequency block and the second frequency block to the UE as separate component carriers in an intra-band carrier aggregation session.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device. The computing device 100 may take many forms; non-limiting examples of the computing device 100 include a fixed wireless access device, cell phone, tablet, internet of things (IoT) device, smart appliance, automotive or aircraft component (e.g., a connected vehicle), pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and a second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, 802.11, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VOIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2A:
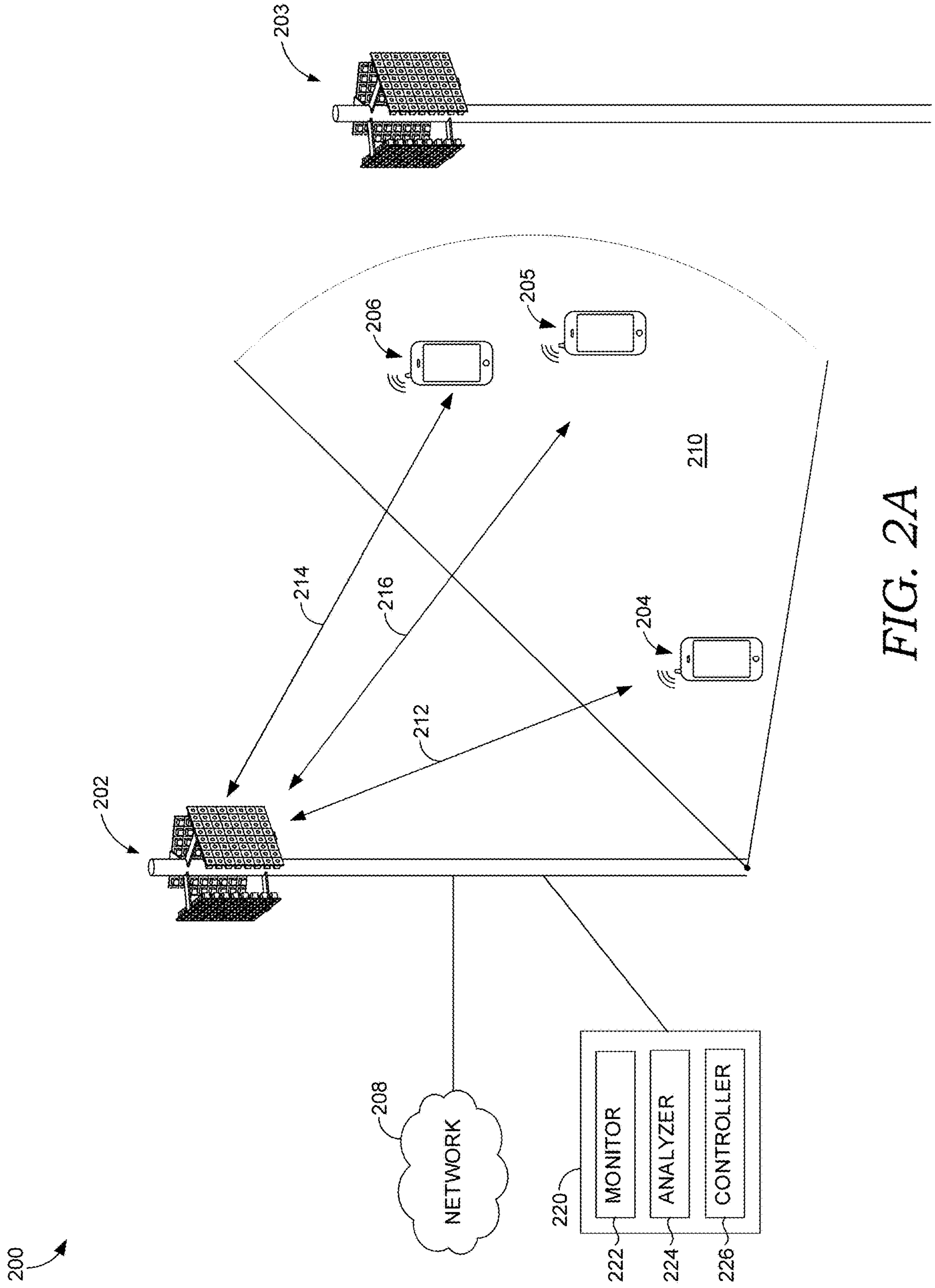
FIGS. 2A-2B illustrate network environments in which implementations of the present disclosure may be employed.
Figure 2B:
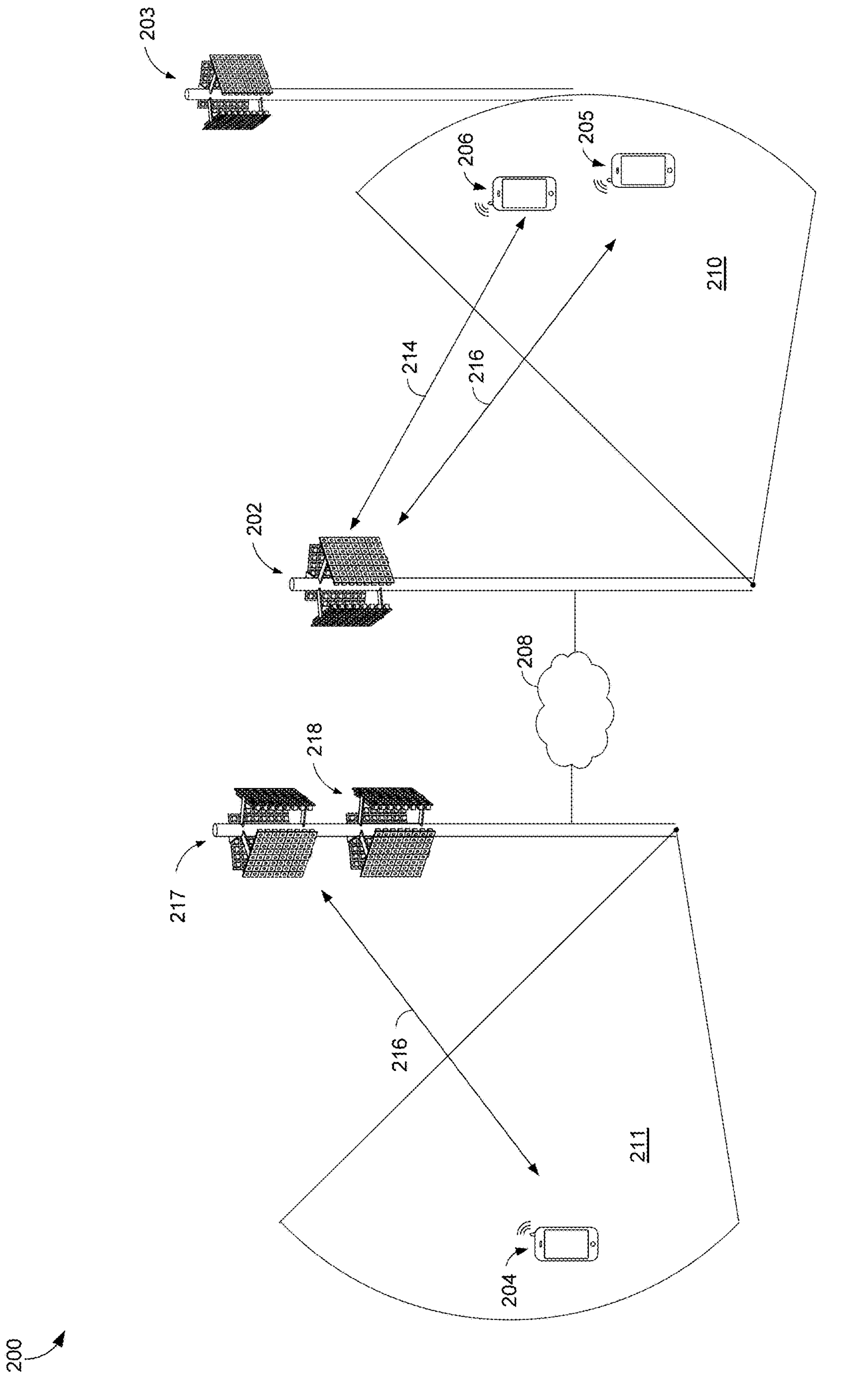

Turning now to FIGS. 2A-2B, an exemplary network environment is illustrated in which implementations of the present disclosure may be employed. Such a network environment is illustrated and designated generally as network environment 200. At a high level the network environment 200 comprises one or more UEs, one or more base stations, and one or more networks. Though each of a first UE 204, a second UE 205, and a third UE 206 are illustrated as cellular phones, a UE suitable for implementations with the present disclosure may be any computing device having any one or more aspects described with respect to FIG. 1. Similarly, though base stations are illustrated as macro cells on a cell tower, any scale or form of access point acting as a transceiver station for wirelessly communicating with a UE, including small cells, pico cells, Wi-Fi access points (e.g., routers or mesh networks), and the like, are suitable for use with the present disclosure.

The network environment 200 comprises one or more base stations with which a UE may wirelessly communicate. Each of a first base station 202, a second base station 203, a third base station 217, and a fourth base station 218 comprise hardware and software components that allow it to wirelessly communicate with one or more UEs in one or more coverage areas. Each coverage area may be logically defined in space and frequency as one or more cells, which may or may not overlap. An example of such a cell is cell 210, in which the first base station 202 is configured to wirelessly communicate with the first UE 204 using a first wireless connection 212, the second UE 205 using a second wireless connection 216, and the third UE 206 using a third wireless connection 214. Using any radio access technology selected by a mobile network operator (e.g., 4G, 5G, 6G, 802.11, and the like), the base station may transmit and receive wireless signals using one or more antenna elements.

Each base station of the one or more base stations may be associated with one or more at least partially distinct networks 208, wherein each network is associated with one or more network identifiers. Each network may be a telecommunications network(s) (e.g., a packet data network or core network), data network, or portions thereof. A telecommunications network that at least partially comprises the network environment 200 may include additional devices or components (e.g., one or more base stations) not shown. Those devices or components may form network environments similar to what is shown in FIG. 2, and may also perform methods in accordance with the present disclosure. Components such as terminals, links, and nodes (as well as other components) may provide connectivity in various implementations.

Figure 3:
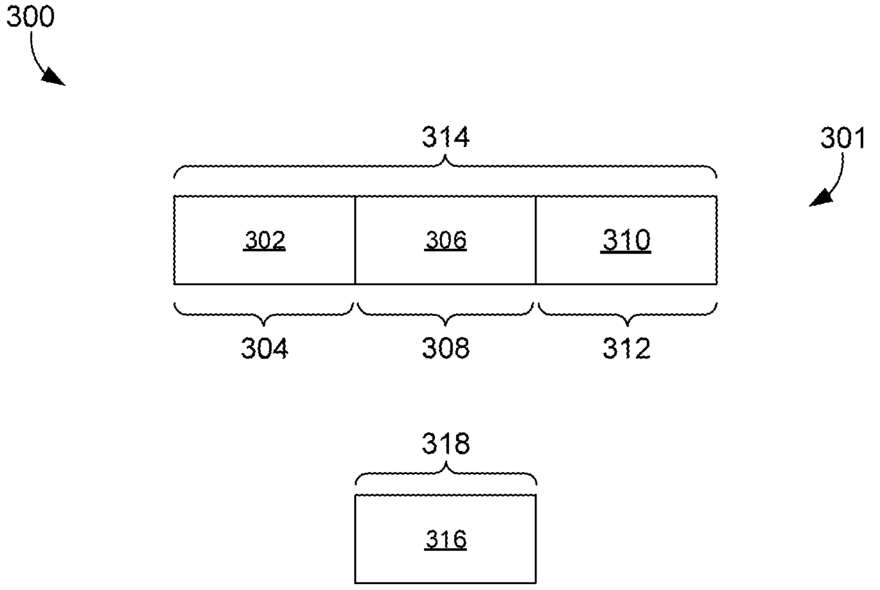
FIG. 3 illustrates a channel resource allocation for use with the present disclosure.

Each cell, such as the cell 210, may have a pre-determined portion (or portions) of the radio frequency (RF) spectrum that is used to communicate with the one or more UEs; in aspects, said pre-determined spectrum may comprise two (or more) non-contiguous blocks of spectrum in a single channel. With reference to FIG. 3, the cell 210 of FIGS. 2A-2B may utilize a first frequency block 302 and a second frequency block 310 of a frequency channel 314, wherein the first frequency block 302 and the second frequency block 310 are non-contiguous in that they are separated by an intervening frequency block 306, and wherein the cell 210 is not permitted (e.g., due to spectrum leasing arrangements) to communicate on the intervening frequency block 306. Though illustrated as being essentially equal in width, each of the first frequency block 302, the second frequency block 310, and the intervening frequency block 306 may have the same or different bandwidths. In one non-limiting illustration, the frequency channel 314 may be a set of frequencies from 1900 MHz to 1915 MHz, the first frequency block 302 may have a first width 304 of 5 MHz (e.g., 1900-1905 MHz), the second frequency block 310 may have a second width 312 of 5 MHz (e.g., 1910-1915 MHz), and the intervening frequency block 306 may have a third width 308 of 5 MHz (e.g., 1905-1910 MHz). In such an example, the cell 210 of FIGS. 2A-2B would be permitted to communicate on 1900-1905 MHz and 1910-1915 MHz, but not 1905-1910 MHz. In order to utilize both the first frequency block 302 and the second frequency block 310, a UE such as the first UE 204 of FIGS. 2A-2B conventionally could be assigned a carrier aggregation session with each of said frequency blocks comprising separate component carriers or the full frequency channel 314 could be utilized with the intervening frequency block 306 blanked. Using carrier aggregation may not always be necessary and may therefore unnecessarily consume a finite number of receive chains at the UE. Alternatively, if the entire frequency channel 314 is used (with the intervening frequency block 306 blanked), a different cell near to the UE uses a third frequency block 316 to communicate with UEs, and the third frequency block has a width 318 that is wholly included in the intervening frequency block 306, then near-far interference could disrupt the UE's ability to decode (and therefore use) the first frequency block 302 and/or the second frequency block 310.

In order to utilize non-contiguous spectrum efficiently, the present disclosure variably allocates non-contiguous frequency blocks in the same band to UEs based on UE capabilities and the radio environment. Returning to FIG. 2A, In aspects where the radio environment is favorable, such as when neighboring base stations do not use frequencies near those used by the first base station 202, or where a neighboring base station using the intervening spectrum is collocated or nearly-collocated with the first base station 202, modern treatment of non-contiguous blocks of spectrum as a single component carrier with the intervening frequency blanked may be utilized. In aspects where the radio environment is less favorable and UEs in the cell 210 experience poor connections with the first base station 202, UE capabilities may be utilized to determine whether a particular UE should be allocated two non-contiguous frequency blocks as distinct component carriers in a carrier aggregation session or whether it should be allocated one of the non-contiguous frequency blocks and not the other. Said determinations may be made using a bandwidth allocation engine 220. Though illustrated as a dedicated engine comprising three discrete modules, the bandwidth allocation engine 220 and its modules are described herein by way of their functionality and may be deployed or implemented in various ways that are consistent with the functionality described herein. For example, the bandwidth allocation engine 220 may take the form of one or more computer processing components at or near the base station 202 executing computer executable instructions that cause the one or more computer processing components to perform the operations described herein. The bandwidth allocation engine 220 may be said to comprise a monitor 222, analyzer 224, and a controller 226.

The monitor 222 is generally configured to receive messages from one or more UEs. Said messages may comprise a UE capability message that indicates, notably, a particular UE's capability of utilizing intra-band carrier aggregation in the downlink and/or uplink; in aspects, said messages may also comprise channel condition reports that indicate one or more key performance indicators of a signal between the particular UE and a connected base station or on a particular frequency. For example, the second UE 205 may communicate to the monitor 222 that it is capable of intra-band carrier aggregation on downlink but not the uplink, and the third UE 206 may communicate to the monitor 222 that it is not capable of intra-band carrier aggregation. Either or both of the second UE 205 and the third UE 206 may communicate a channel quality report that indicates that near-far interference may be present in their vicinity; for example, the second UE 205 may report a poor signal to interference noise ratio on a connection between it and the first base station 202 or the third UE 206 may report a threshold high reference signal receive power (RSRP) on a frequency in the intervening frequency block of FIG. 3.

The analyzer 224 is generally configured to factor UE capabilities and radio conditions in order to make determinations about how channel resources of the channel frequency 314 of FIG. 3 should be allocated to a particular UE. In a first embodiment, the analyzer 224 may be pre-configured to not use the intervening frequency block 306 of FIG. 3; such an embodiment may be based on, for example, a determination that the neighboring base station 203 utilizes the third frequency block 316 of FIG. 3 and that the neighboring base station 203 is greater than a first threshold distance from the first base station 202 and within a second threshold distance (i.e., the neighboring base station 203 is located between the first and second threshold distances). In said embodiment, the analyzer 224 will base channel resource allocations at least partially on UE capabilities; for example, the second UE 205 may be allocated the first frequency block 302 and the second frequency block 310 of FIG. 3 as discrete carrier components in a carrier aggregation session, and the third UE 206 may be allocated either the first frequency block 302 or the second frequency block 310 (because the third UE 206 is not capable of intra-band carrier aggregation). Turning briefly to FIG. 2B, the analyzer 224 may alternatively determine that the intervening frequency block 306 of FIG. 3 may be used to communicate with a UE, such as the first UE 204 based on a determination that a serving base station and a potentially-interfering base station are co-located (or within a threshold distance of each other); for example, if the first UE 204 is located in a second cell 211 served by a third base station 217 using the same non-contiguous frequency blocks described with respect to FIG. 3 and a fourth base station 218 using at least a portion of the intervening frequency block 306 of FIG. 3 is co-located with the third base station 217, then near-far interference between the third base station 217 and fourth base station 218 is not a concern and the third base station may utilize the channel frequency 314 of FIG. 3 (with the intervening frequency block 306 blanked) without the need to factor the capabilities of the first UE 204.

Returning to FIG. 2A, in a second embodiment, the analyzer 224 may dynamically determine the radio conditions of the cell 210 and combine the radio environment factor with the UE capability factor in order to make appropriate channel resource allocation determinations. In said embodiment, the frequency channel 314 of FIG. 3 may be allocated to any UE in the cell 210 with the intervening frequency block 306 of FIG. 3 blanked based on a determination that there is threshold low power from other signals in the intervening frequency block 306. If, based on a determination that threshold high power from other signals in the intervening frequency block of FIG. 3 is present, the analyzer 224 may factor UE capabilities as described with respect to the first embodiment in order to determine how channel resources may be allocated.

In one non-limiting example, the analyzer 224 may variably allocate channel resources between each of the first UE 204, the second UE 205, and the third UE 206. In said example, the analyzer 224 may be configured to dynamically factor the radio environment; the first UE 204 may report favorable radio conditions across the full frequency channel 314 of FIG. 3 (e.g., due to the neighboring base station 203 being relatively further away), and each of the second UE 205 and the third UE 206 may report one or more key performance indicators that indicate unfavorable radio conditions on at least a portion of the intervening frequency block 306 of FIG. 3 (e.g., due to the neighboring base station 203 using the third frequency block 316 of FIG. 3 and being relatively closer to said UEs). Based on the radio environment, the analyzer 224 may allocate the full channel frequency 314 of FIG. 3 to the first UE with the intervening frequency block 306 blanked. Based on the radio environment being unfavorable vis-à-vis the second UE 205 and an indication that the second UE 205 is capable of intra-band carrier aggregation, the analyzer 224 may allocate the first frequency block 302 and the second frequency block 310 of FIG. 3 as discrete component carriers in a carrier aggregation session. Based on the radio environment being unfavorable vis-à-vis the third UE 206 and an indication the third UE 206 is not capable of carrier aggregation, the analyzer 224 may allocate either the first frequency block 302 or the second frequency block 310 of FIG. 3 (i.e., the first frequency block exclusive or (XOR) the second frequency block).

The controller 226 of bandwidth allocation engine 220 is generally configured to receive one or more indications from the analyzer 224 and determine how subsequent resource allocations should be communicated from the first base station 202. Based on an indication from the analyzer 224 that the full channel frequency 314 of FIG. 3 should be allocated to the first UE 204, the controller 226 instructs a scheduler of the first base station 202 that a UE-specific channel bandwidth is the same as the cell-specific channel bandwidth and that the scheduler should blank the physical resource blocks in the intervening frequency block 306 of FIG. 3. Based on an indication from the analyzer 224 that the first frequency block 302 and the second frequency block 310 of FIG. 3 should be allocated to the second UE 205 in an intra-band carrier aggregation session, the controller 226 instructs the scheduler that each of the component carriers have a UE-specific channel bandwidth less than cell-specific channel bandwidth. Based on an indication from the analyzer 224 that the first frequency block 302 or the second frequency block 310 of FIG. 3 should be allocated to the third UE 206 without intra-band carrier aggregation session, the controller 226 instructs the scheduler that only one of the first frequency block 302 or the second frequency block 310 of FIG. 3 should be allocated to the third UE 206.

Figure 4:
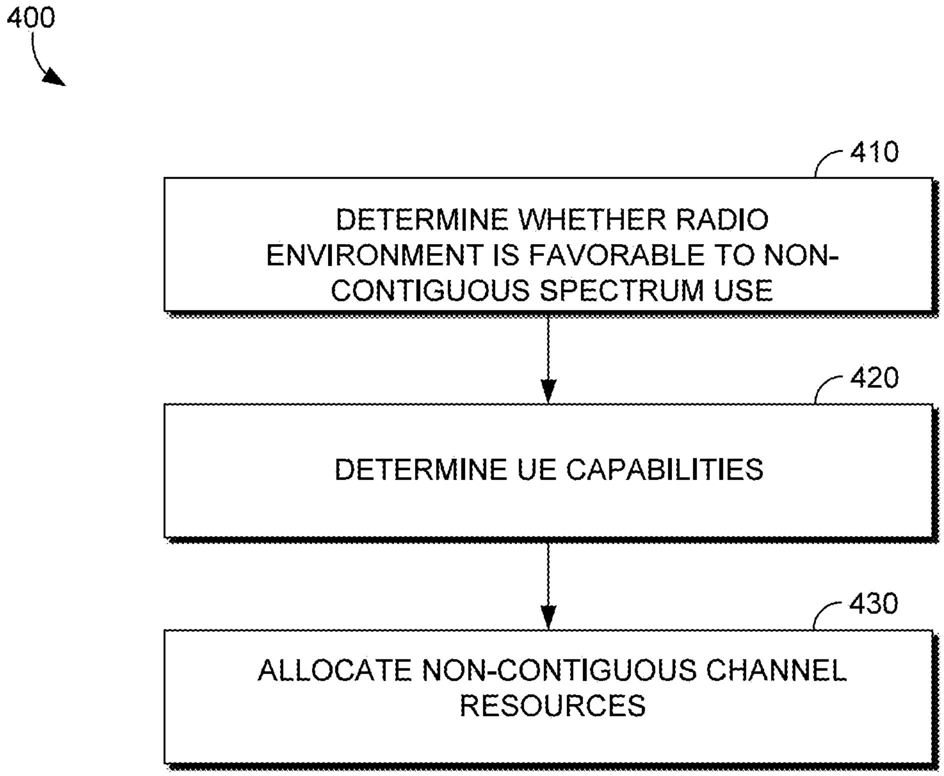
FIG. 4 depicts a flow diagram of a method in accordance with embodiments described herein.

Turning now to FIG. 4, a flow chart representing a method 400 is provided. Generally the method 400 may be used by a base station, such as the base station 202 of FIG. 2, to allocate non-contiguous frequency resources to one or more UEs. At a first step 410, a determination is made that a radio environment, such as the network environment 200 of FIGS. 2A-2B, does not permit the use of non-contiguous frequency blocks as a single component carrier with an intervening frequency block blanked, according to any one or more aspects described with respect to FIGS. 2A-3. At a second step 420, UE capabilities are determined in order to select between different manners of allocating the non-contiguous frequency blocks, according to any one or more aspects described with respect to FIGS. 2A-3. At a third step 430, non-contiguous frequency blocks are allocated to a particular UE based radio environment conditions and the particular UE's capabilities, according to any one or more aspects described with respect to FIGS. 2A-3.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for allocating non-contiguous frequency resources to a user equipment (UE) in a wireless communication system, the system comprising:

a first base station configured to wirelessly communicate with a first coverage area;

a second base station configured to wirelessly communicate with a second coverage area;

a third base station configured to wirelessly communicate with a third coverage area; and one or more computer processing components configured to perform operations comprising:

allocating a bandwidth to a first session between the first base station and a first UE based on a determination that one or more key performance indicators (KPIs) are better than a threshold in an intervening portion of the bandwidth in the first coverage area, the bandwidth comprising a first portion, a second portion, and the intervening portion, wherein the intervening portion at least partially separates the first portion from the second portion;

allocating the first portion without allocating the intervening portion and the second portion to a second session between the second base station and a second UE based on a determination that the one or more KPIs are worse than the threshold in the intervening portion in the second coverage area and based on a determination that the second UE does not meet one or more aggregation requirements; and allocating the first portion and the second portion without allocating the intervening portion to a third session between the third base station and a third UE based on the determination that the one or more KPIs are worse than the threshold in the intervening portion in the third coverage area and based on a determination that the third UE meets one or more aggregation requirements, wherein the first portion and the second portion are used in a carrier aggregation session between the third base station and the third UE.

2. The system of claim 1, wherein each of the first base station, second base station, and third base station are different, and each of the first coverage area, the second coverage area, and the third coverage area are different.

3. The system of claim 1, wherein the one or more aggregation requirements comprise an ability to use intra-band carrier aggregation.

4. The system of claim 3, wherein the intervening portion of the first session comprises blanked physical resource blocks.

5. The system of claim 4, wherein determining that the one or more KPIs are better than the threshold is based on a report from the first UE and determining that the one or more KPIs are worse than the threshold is based on a report from at least one of the second UE and the third UE.

6. The system of claim 5, wherein the one or more KPIs comprises a signal to interference noise ratio.

7. The system of claim 5, wherein the one or more KPIs comprises a reference signal receive power of a signal transmitted by a non-serving base station.

8. The system of claim 4, wherein determining that the one or more KPIs are better than the threshold is based on a determination that a neighboring base station using the intervening portion of the bandwidth is located within a threshold distance of the first base station.

9. The system of claim 4, wherein determining that the one or more KPIs are worse than the threshold is based on a determination that a neighboring base station using the intervening portion of the bandwidth is located greater than a threshold distance from the first base station.

* * * * *